(12) United States Patent
Kim

(10) Patent No.: US 10,734,623 B2
(45) Date of Patent: Aug. 4, 2020

(54) BATTERY PACK

(71) Applicant: SAMSUNG SDI CO., LTD., Yongin-si, Gyeonggi-do (KR)

(72) Inventor: Duk-Jung Kim, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 473 days.

(21) Appl. No.: 15/403,343

(22) Filed: Jan. 11, 2017

(65) Prior Publication Data

US 2018/0062133 A1    Mar. 1, 2018

(30) Foreign Application Priority Data

Aug. 31, 2016    (KR) .................. 10-2016-0111824

(51) Int. Cl.
*H01M 2/12*    (2006.01)
*H01M 2/10*    (2006.01)
*H01M 10/48*    (2006.01)

(52) U.S. Cl.
CPC ....... *H01M 2/1235* (2013.01); *H01M 2/1077* (2013.01); *H01M 10/482* (2013.01); *H01M 2200/20* (2013.01)

(58) Field of Classification Search
CPC ... H01M 2/345; H01M 10/445; H01M 10/482
See application file for complete search history.

(56) References Cited

U.S. PATENT DOCUMENTS

| | | | |
|---|---|---|---|
| 6,080,505 A * | 6/2000 | Pate | H01G 9/12 429/53 |
| 2009/0053586 A1 * | 2/2009 | Fredriksson | H01M 2/08 429/57 |
| 2013/0093383 A1 | 4/2013 | Kim et al. | |
| 2014/0212709 A1 * | 7/2014 | Roh | H01M 2/0217 429/56 |
| 2014/0302357 A1 | 10/2014 | Tsuruta et al. | |
| 2015/0162578 A1 * | 6/2015 | Kim | H01M 2/1072 429/82 |
| 2016/0308182 A1 * | 10/2016 | Kim | H01M 2/1258 |

FOREIGN PATENT DOCUMENTS

| | | | |
|---|---|---|---|
| JP | 2009-301888 A | | 12/2009 |
| JP | 2011175844 A | * | 9/2011 |
| JP | 2014-220233 A | | 11/2014 |
| KR | 10-2013-0040575 A | | 4/2013 |

OTHER PUBLICATIONS

Machine translation of JP 2011-175844 A (Year: 2011).*

* cited by examiner

*Primary Examiner* — Robert S Carrico
(74) *Attorney, Agent, or Firm* — Lee IP Law, PC

(57) ABSTRACT

A battery pack includes a plurality of cells, a chamber adjacent to the plurality of cells, and a pressure sensor in the chamber to detect an internal pressure of the chamber, wherein each of the cells includes a first vent hole to open to exhaust a cell internal pressure to an exterior of the cell when the cell internal pressure is equal to or greater than a first pressure level, and a second vent hole to open to exhaust the cell internal pressure into the chamber when the cell internal pressure is equal to or greater than a second pressure level, the first pressure level being higher than that the second pressure level.

8 Claims, 12 Drawing Sheets

BATTERY PACK

CROSS-REFERENCE TO RELATED APPLICATION

Korean Patent Application No. 10-2016-0111824, filed on Aug. 31, 2016, in the Korean Intellectual Property Office, and entitled: "Battery Pack," is incorporated by reference herein in its entirety.

BACKGROUND

1. Field

Exemplary embodiments relate to a battery pack.

2. Description of the Related Art

In accordance with recent environmental regulations, e.g., $CO_2$ regulations, there has been a growing interest in environmentally-friendly vehicles. Thus, car companies have been actively promoting research and product development for pure electric vehicles or hydrogen vehicles, as well as hybrid vehicles or plug-in hybrid vehicles.

A high voltage battery for storing electrical energy obtained from various energy sources is applied to the environmentally-friendly vehicles. A lithium ion battery may be employed as a high voltage battery applied to the vehicle.

SUMMARY

An exemplary embodiment provides a battery pack including a plurality of cells, a chamber, and a pressure sensor configured to detect an internal pressure of the chamber, wherein each of the cells includes a first vent hole opened to exhaust a cell internal pressure to a cell outside when the cell internal pressure is equal to or greater than a first pressure level, and a second vent hole opened to exhaust the cell internal pressure to an internal space of the chamber when the cell internal pressure is equal to or greater than a second pressure level, wherein the first pressure level is higher than that the second pressure level.

The chamber may include a plurality of pressure introducing tubes configured to connect the second vent hole of each of the cells with an internal space of the chamber.

Each of the pressure introducing tubes may be coupled to the second vent hole by a press-fit or shrink-fit method.

The pressure sensor may be realized as a strain gauge or piezo gauge type.

The second vent hole may be closed and sealed by a vent plate that is opened when the cell internal pressure is equal to or greater than the second pressure level.

The battery pack may further include a controller configured to detect the internal pressure of the chamber through the pressure sensor, and to detect cell leakages of the cells by comparing a current internal pressure of the chamber with an internal pressure of the chamber measured at a time point.

The time point may be a previous charge time point.

The controller may determine that the cell leakage is generated when the current internal pressure is lower than the internal pressure of the chamber measured at the time point and current internal pressure is equal to or lower than a predetermined lower limit.

The chamber may include a plurality of pressure introducing tubes, each of which has a hollowed portion formed for connecting the vent hole of each of the cells with an internal space of the chamber, and each of the pressure introducing tubes may be coupled to the vent hole by a press-fit or shrink-fit method.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
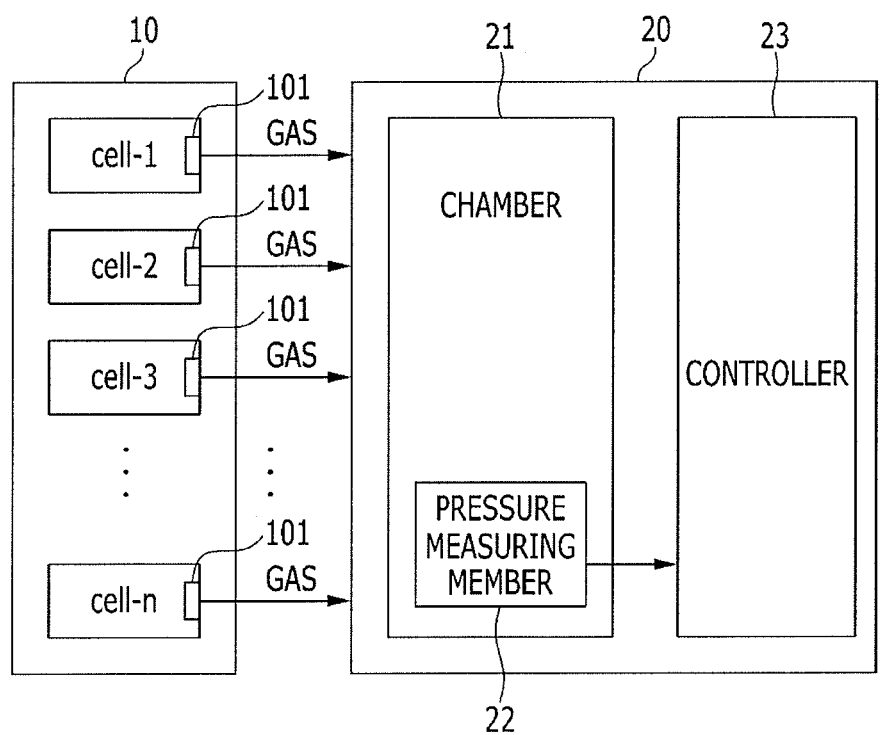
FIG. 1 schematically illustrates a battery abnormality detection apparatus according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

A case of electrically connecting two constituent elements includes not only a case of directly connecting the constituent elements but also a case of connecting the constituent elements via another constituent element therebetween. The constituent element therebetween may include a switch, a resistor, a capacitor, and the like. In describing exemplary embodiments, an expression of connection indicates electrical connection unless explicitly described to be direct connection.

Hereinafter, a battery pack and a battery abnormality detection apparatus will be described according to exemplary embodiments with reference to necessary drawings.

FIG. 1 schematically illustrates a battery abnormality detection apparatus according to an exemplary embodiment.

Referring to FIG. 1, a battery module 10 according to the present exemplary embodiment may include a plurality of unit cells, e.g., cell-1, cell-2, cell-3, . . . , and cell-n, which are connected in series or in parallel to each other. Each of the cells cell-1, cell-2, cell-3, . . . , and cell-n includes a pre-vent hole 101 that is opened or closed depending on an internal pressure of the cell. The pre-vent hole 101 is initially in a closed state, and when the internal pressure of a corresponding cell is increased to be equal to or greater than a predetermined level, the pre-vent hole 101 is deformed to be opened.

Figure 4:
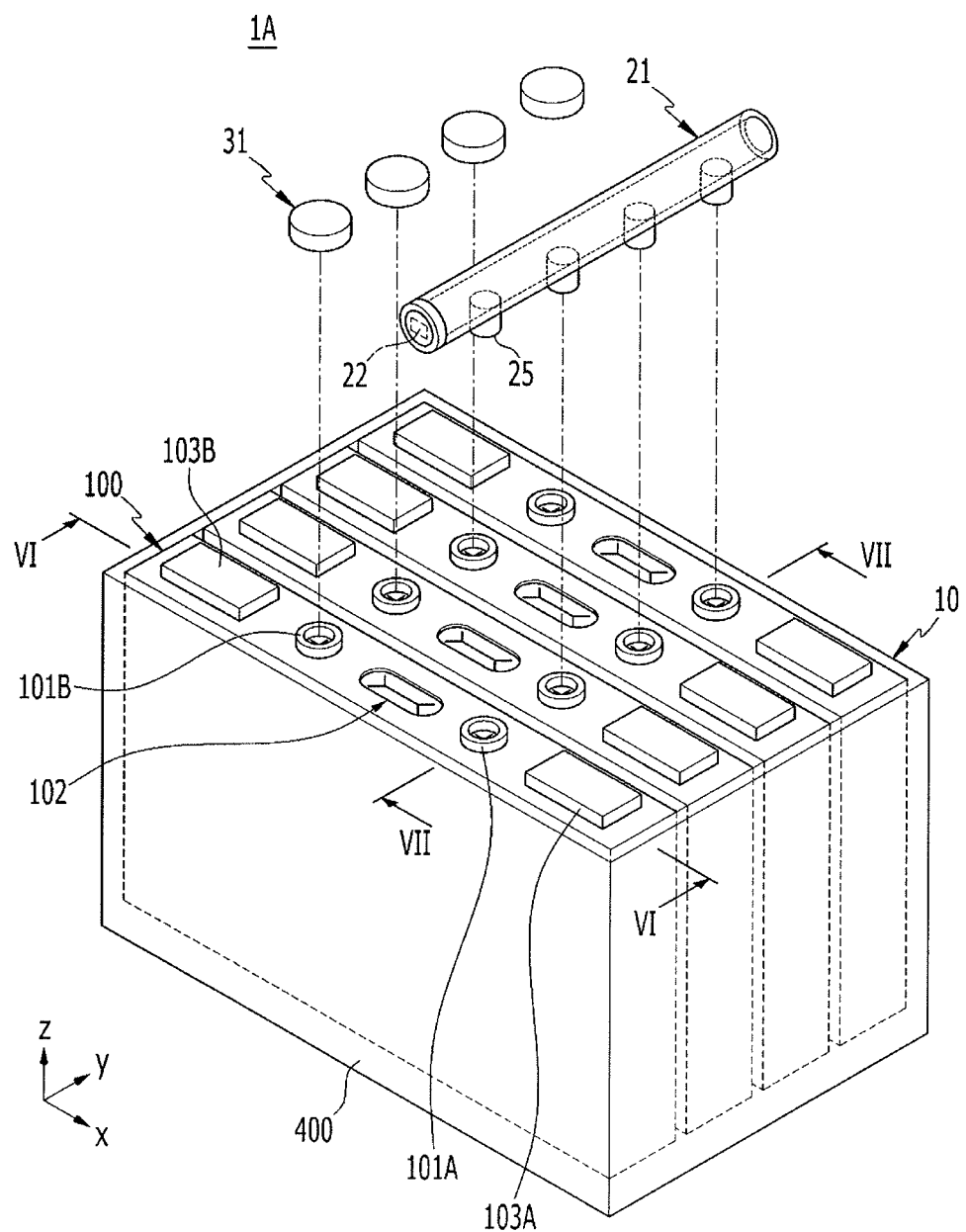
FIG. 4 illustrates an exploded perspective view of a battery pack according to an exemplary embodiment.

A battery abnormality detection apparatus 20 may include a chamber 21, a pressure measuring member 22, and a controller 23. The battery abnormality detection apparatus 20 is connected to the pre-vent holes 101 of the battery module 10 (FIG. 4).

In detail, the chamber 21 serves as a pressure measuring chamber for measuring the pressure of the cells cell-1, cell-2, cell-3, . . . , and cell-n included in the battery module 10 by a unit of the battery module. The chamber 21 is connected with the pre-vent holes 101 disposed in the cells cell-1, cell-2, cell-3, . . . , and cell-n. Accordingly, when the pre-vent hole 101 of at least one of the cells cell-1, cell-2, cell-3, . . . , and cell-n is opened, gas in a cell having the opened pre-hole 101 is introduced into the chamber 21 through the open pre-vent hole 101. A connection structure between the chamber 21 and the pre-vent hole 101 of each cell will be described with reference to FIGS. 4-9.

The pressure measuring member 22, i.e., a pressure sensor, is coupled to the chamber 21 to detect an internal pressure of the chamber 21. The pressure measuring member 22 is a pressure sensor that serves to convert the measured pressure into an electrical signal. The pressure measuring member 22 is not particularly limited, but may be, e.g., a piezo-gauge type, a strain-gauge type, or the like.

The controller 23 obtains an internal pressure of the chamber 21, i.e., a pressure value in a unit of the battery module (hereinafter, referred to as a module pressure value) through the pressure measuring member 22, and detects abnormality of the cells cell-1, cell-2, cell-3, . . . , and cell-n based on the module pressure value obtained through the pressure measuring member 22. This will be described in more detail below with reference to FIG. 2.

Figure 2:
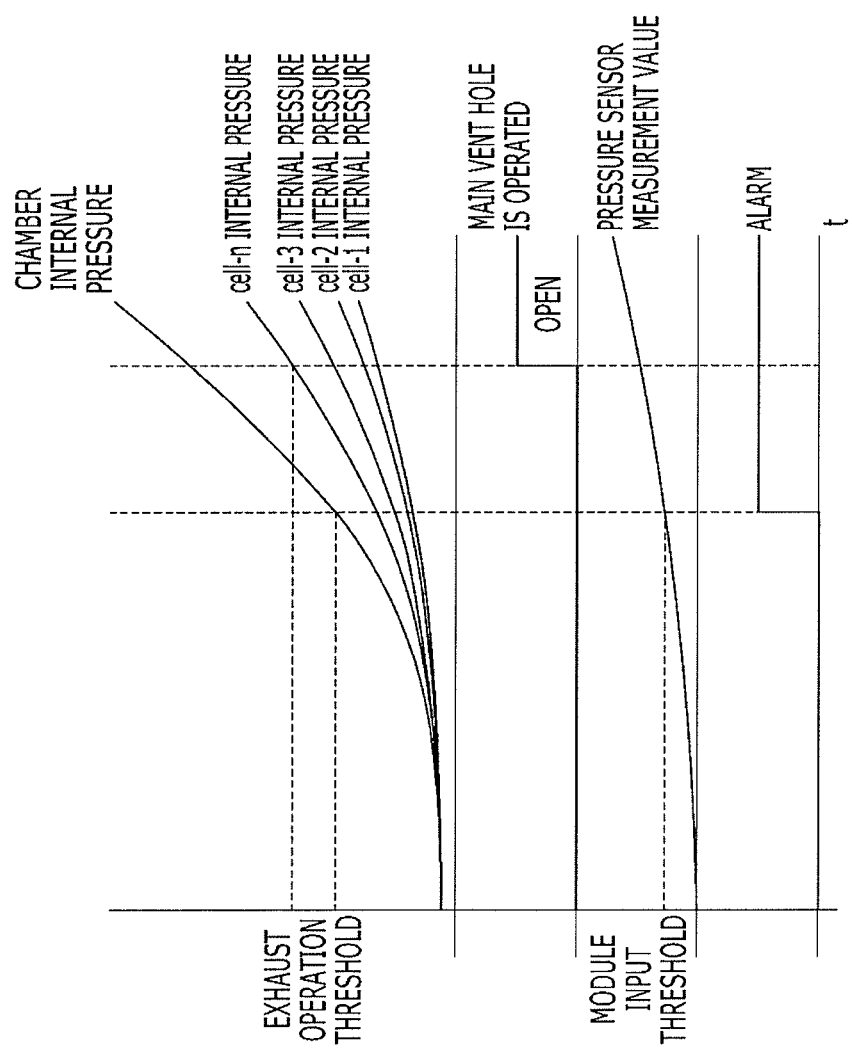
FIG. 2 illustrates a method of detecting a cell overpressure state in a controller of FIG. 1.

FIG. 2 illustrates a method for detecting a cell overpressure state in the controller 23.

Referring to FIGS. 1-2, when the pre-vent hole 101 is opened, the internal pressure of the chamber 21 is varied depending on internal pressure variations of the cells cell-1, cell-2, cell-3, . . . , and cell-n. When charging is continuously performed, each internal pressure of the cells cell-1, cell-2, cell-3, . . . , and cell-n is increased. As a result, when the cells cell-1, cell-2, cell-3, . . . , and cell-n are continuously charged, the internal pressure of the chamber 21 may be continuously increased (see solid lines in "exhaust operation threshold" in FIG. 2).

Thus, when a measured internal pressure of the chamber 21, as measured by the pressure measuring member 22 (see "Pressure sensor measurement value" in FIG. 2), is equal to or greater than a module pressure threshold value, the controller 23 determines that cell overpressure is generated by the overcharge, and outputs an alarm warning about the overpressure (see "alarm" in FIG. 2). The module pressure threshold value may be designed to be set such that overpressure determination is made before a main vent hole (see reference numeral 102 of FIG. 5) is operated to exhaust a cell internal pressure that is increased to be equal to or greater than the module pressure threshold value, to the outside. Thus, the controller 23 can detect the cell overpressure to warn about the dangerous situation before a state, in which it is impossible to permanently use a cell having a main vent hole that has been operated, occurs. That is, once the controller 23 detects a measured pressure in the chamber 21 that exceeds a predetermined pressure, e.g., due to continuous charging of all cells that continuously release excess gas through the pre-vent holes 101 into the chamber 21, the controller 23 triggers an alarm. (FIG. 2).

Figure 3:
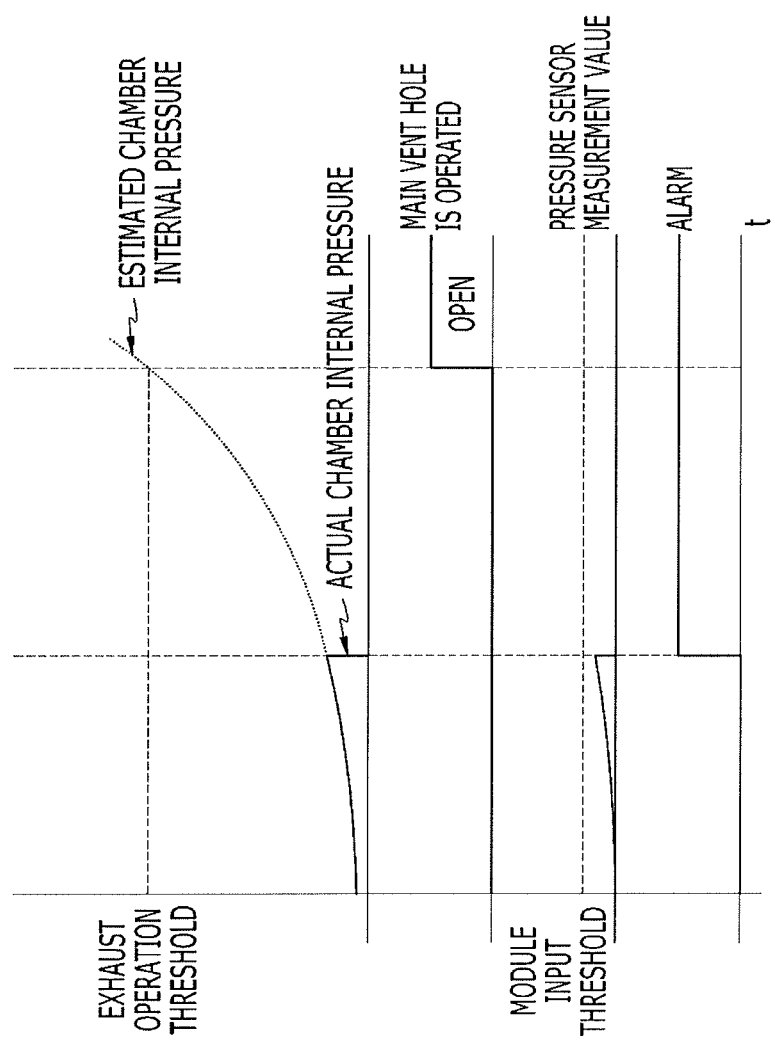
FIG. 3 illustrates a method of detecting cell leakage in the controller of FIG. 1.

FIG. 3 illustrates a method of detecting cell leakage in the controller 23.

Referring to FIG. 3, in a state in which the pre-vent hole 101 is opened, the internal pressure of the chamber 21 may be increased in a normal case (dotted line in FIG. 3 referred to as "estimated chamber internal pressure"). However, when there is a leakage in at least one cell, the internal pressure of the chamber 21 is reduced to be lower than a previous internal pressure at a specific time point, and is reduced to atmospheric pressure (solid line in FIG. 3 referred to as "actual chamber internal pressure").

Accordingly, the controller 23 may continuously detect a measured internal pressure of the chamber 21 (see a measurement value of the pressure measuring member of FIG. 2), and may detect cell leakage by comparing a current measured internal pressure with a previously measured internal pressure at a specific time point. For example, the specific time point at which the internal pressure of the chamber 21 is obtained to be compared with the current internal pressure of the chamber 21 may be a previous charge time point.

When the current internal pressure of the chamber 21 is lower than the internal pressure of the chamber 21 measured at the specific time point, and drops to a predetermined lower limit (about atmospheric pressure) or lower, the controller 23 may determine that the cell leakage is generated. For example, when the current internal pressure of the chamber 21, e.g., at time t=15, is lower than the internal pressure of the chamber 21 measured at the specific time point, e.g., at time t=10, and drops to a predetermined lower limit (about atmospheric pressure) or lower, the controller 23 may determine that a cell leakage has been generated. When it is determined that the cell leakage is generated, the controller 23 outputs an alarm warning about the cell leakage.

Meanwhile, it is necessary to provide a structure for exhausting the internal pressure of each of the cells cell-1, cell-2, cell-3, . . . , and cell-n to the pressure measuring chamber 21. Hereinafter, a battery pack having a connection structure for exhausting a cell internal pressure to a pressure measuring chamber will be described in detail with reference to FIG. 4 to FIG. 9.

Figure 5:
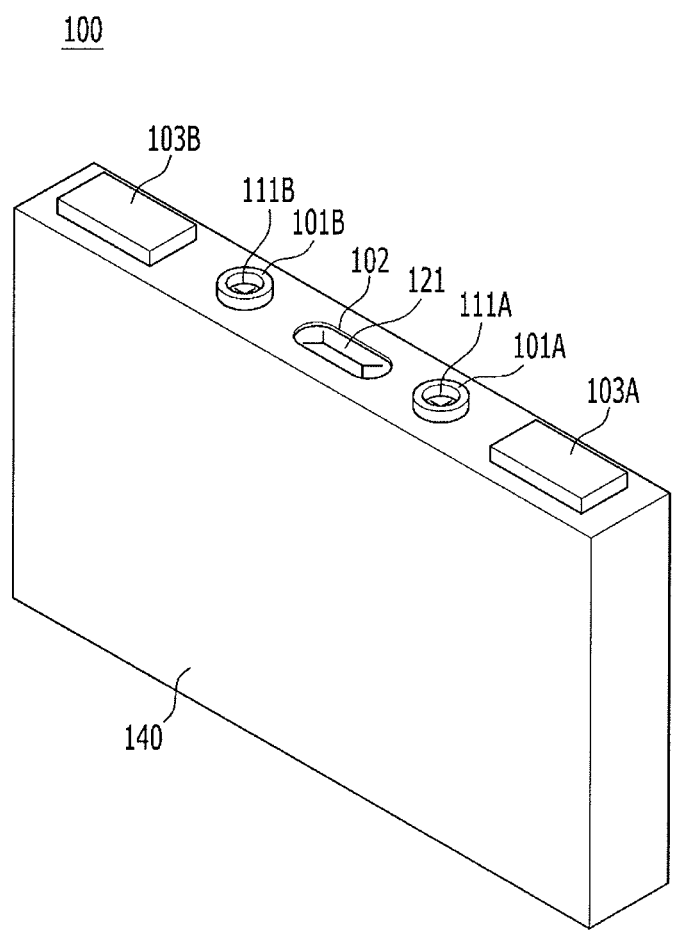
FIG. 5 illustrates a perspective view of a unit cell in the battery pack in FIG. 4.
Figure 6:
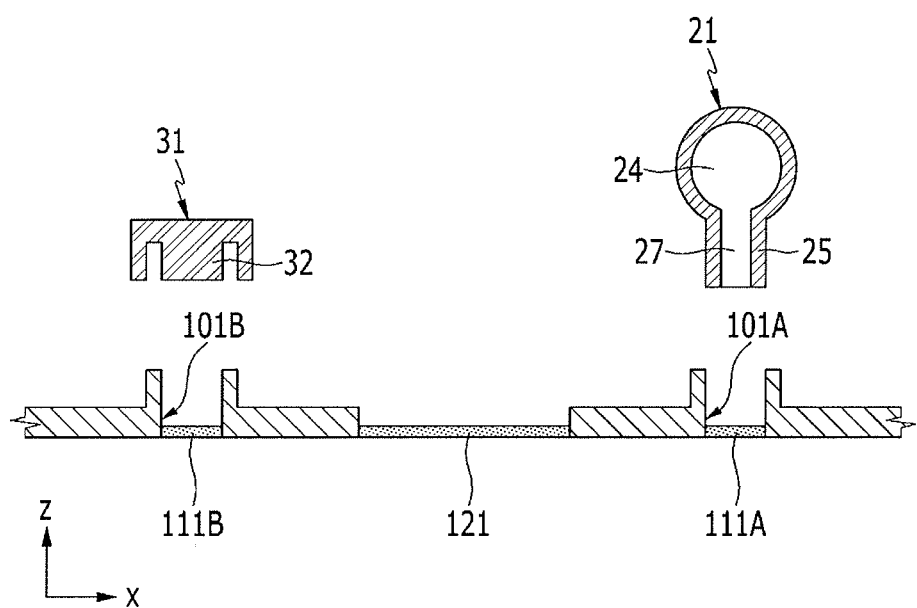
FIG. 6 illustrates a partial cross-sectional view of the battery pack of FIG. 4 taken along the line VI-VI.
Figure 7:
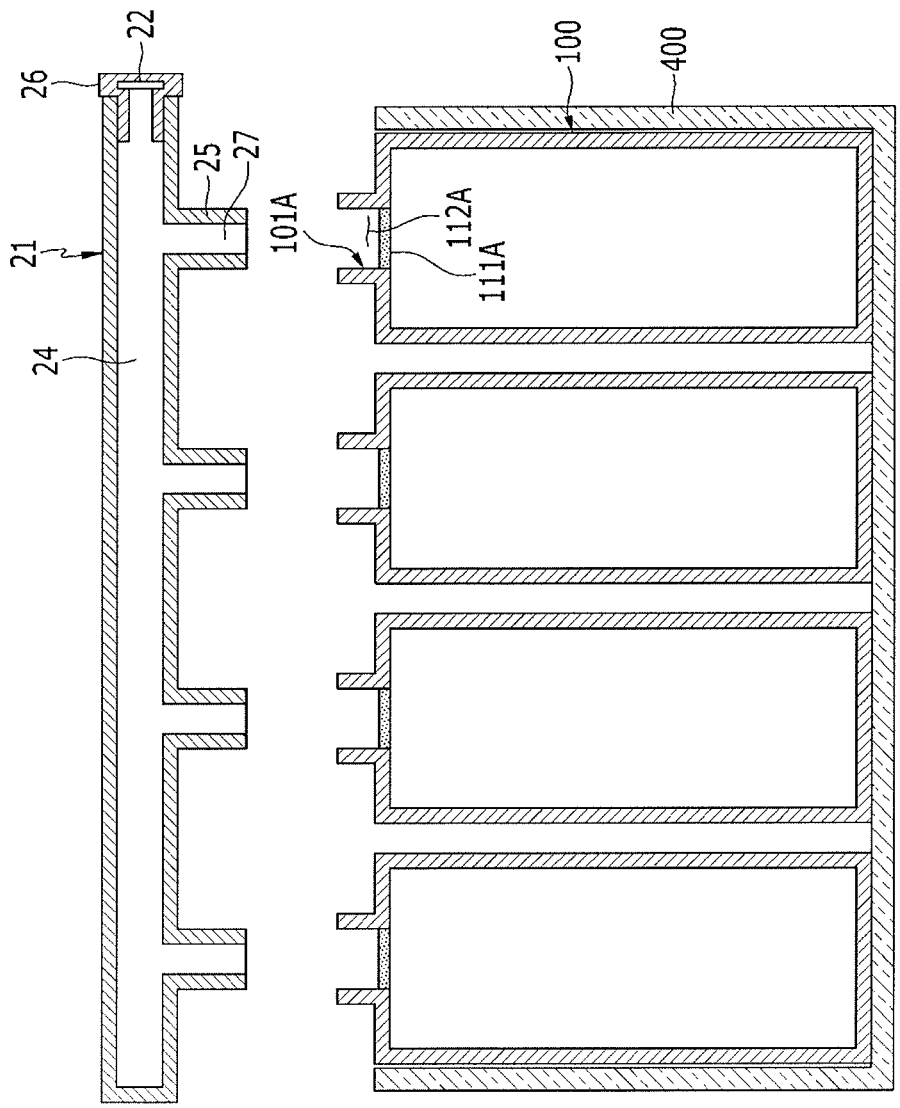
FIG. 7 illustrates a partial cross-sectional view of the battery pack of FIG. 4 taken along the line VII-VII.
Figure 8:
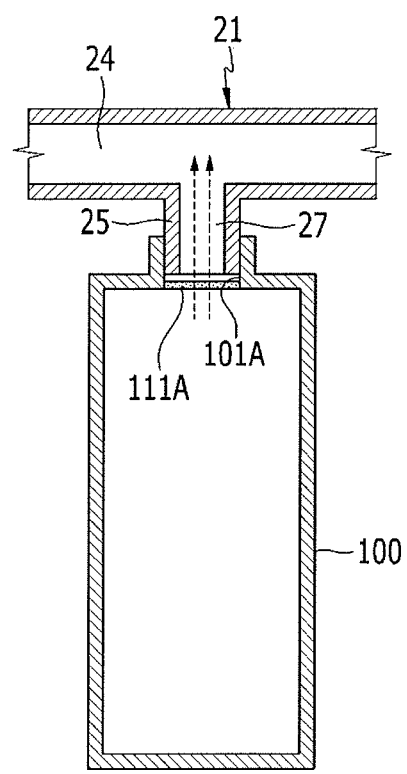
FIG. 8 and FIG. 9 illustrate examples of a coupling structure between a pre-vent hole and a pressure introducing tube of a chamber in a battery pack according to an exemplary embodiment.
Figure 9:
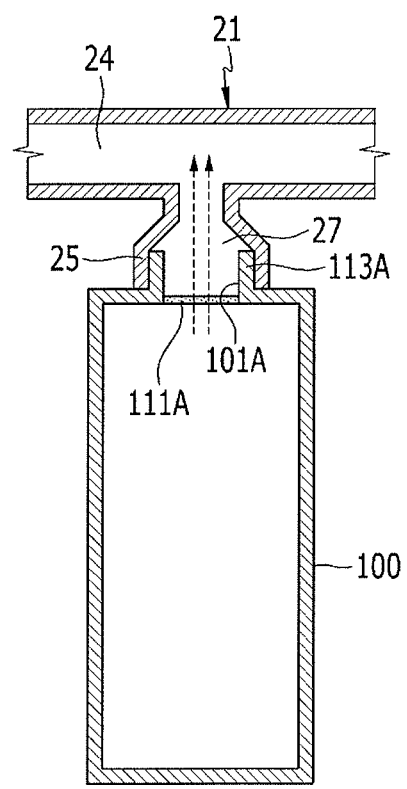

FIG. 4 is an exploded perspective view schematically illustrating a battery pack according to an exemplary embodiment, and FIG. 5 is a perspective view schematically illustrating a unit cell in the battery pack in FIG. 4. FIG. 6 is a partial cross-sectional view of the battery pack of FIG. 4 taken along the line VI-VI, and FIG. 7 is a partial cross-sectional view of the battery pack of FIG. 4 taken along the line VII-VII. FIG. 8 and FIG. 9 illustrate examples of a coupling structure between a pre-vent hole and a pressure introducing tube of a chamber in a battery pack according to an exemplary embodiment.

Referring to FIG. 4 and FIG. 5, a battery pack 1A according to the present exemplary embodiment may include the battery module 10, the chamber 21 for measuring an internal pressure of a cell in a unit of battery module, the pressure measuring member 22 disposed in the chamber 21, and a housing 400 configured to accommodate the battery module 10. The battery module 10 may include a plurality of cells 100.

Referring to FIG. 5, each of the cells 100 may include a case 140, and an electrode assembly and an electrolyte solution accommodated in the case 140. Further, the cell 100 includes pre-vent holes 101A and 101B, a main vent hole 102, and a plurality of electrode terminals 103A and 103B, disposed in one surface of the case 140. The case 140 includes a space therein for accommodating the electrode assembly and the electrolyte solution.

The pre-vent holes 101A and 101B are closed and sealed by vent plates 111A and 111B, respectively. The main vent hole 102 is closed and sealed by a vent plate 121.

The vent plate 121 of the main vent hole 102 initially closes and seals the main vent hole 102, and is cut to open the main vent hole 102 when an internal pressure of the cell 100 reaches a predetermined level (exhaust operation threshold value of FIG. 2). A notch may be formed in the vent plate 121 of the main vent hole 102 to induce the cutting of the vent plate 121. When the main vent hole 102 is opened, the internal cell pressure is exhausted to the outside of the case 140 through the main vent hole 102. As a result, when the main vent hole 102 is opened, an internal gas and the like of the cell 100 is exhausted to the outside through the main vent hole 102.

The vent plate 111A of the pre-vent hole 101A initially closes and seals the pre-vent hole 101A, and is cut to open the pre-vent hole 101A when the internal pressure of the cell 100 reaches a predetermined level. A notch may be formed in the vent plate 111A of the pre-vent hole 101A to induce the cutting of the vent plate 111A. The vent plate 111A of the pre-vent hole 101A may be designed to have a thickness or a notch size so as to be cut at a cell internal pressure that is lower than that of the vent plate 121 of the main vent hole 102. Accordingly, the pre-vent hole 101A may be opened at a cell internal pressure that is lower than that of the main vent hole 102.

The pre-vent hole 101A is connected with the module pressure measuring chamber 21 to exhaust the internal pressure of the cell 100 into the chamber 21 when it is opened. Specifically, when the pre-vent hole 101A is opened, an internal gas and the like of the cell 100 is exhausted into the chamber 21 through the pre-vent hole 101A.

The cell 100 may further include an auxiliary pre-vent hole 101B that is opened under a same pressure as that of the pre-vent hole 101A. For example, the structure of the auxiliary pre-vent hole 101B and its corresponding vent plate 111B may be substantially the same as those of the pre-vent hole 101A and its corresponding vent plate 111A, respectively.

In the present exemplary embodiment, at least one of the pre-vent hole 101A and the auxiliary pre-vent hole 101B may be used to introduce the internal pressure of the cell 100 into the chamber 21. If an opening of one of the pre-vent hole 101A and the auxiliary pre-vent hole 101B is not used, it may be sealed by a sealer 31 to prevent loss of the electrolyte solution. As shown in FIG. 6, the sealer 31 can seal the non-used vent hole by coupling a protrusion 32 to the non-used vent hole by a press-fit or shrink-fit method.

The chamber 21 includes an internal space in which the gas exhausted from the cell 100 through the pre-vent holes 101A is gathered. The pressure measuring member 22 is disposed in the chamber 21 to detect pressure introduced into the chamber 21 through the pre-vent holes 101A.

Referring to FIGS. 4 and 6-7, the chamber 21 has a pipe shape with one open side, and includes a space 24 in which the gas introduced from the cells 100 is gathered. A sealer 26 is coupled to the open side of the chamber 21 to block the internal space of the chamber 21 from the outside. The pressure measuring member 22 may be disposed in the sealer 26.

The chamber 21 includes a plurality of pressure introducing tubes 25 for introducing the gas exhausted from the cells 100 through the pre-vent holes 101A into the internal space 24. Each pressure introducing tube 25 is formed to protrude from an external surface of the chamber 21, e.g., toward a corresponding cell 100, and includes a hollowed portion 27 connected with the internal space 24 of the chamber 21 at the center. The pressure introducing tube 25 is coupled to the pre-vent hole 101A of a corresponding cell 100 to guide the gas exhausted from the pre-vent hole 101A through the hollowed portion 27 into the chamber 21. The pressure introducing tube 25 may be coupled to the pre-vent hole 101A by a press-fit or shrink-fit method.

For example, as illustrated in FIG. 8, the pressure introducing tube 25 may be coupled to the pre-vent hole 101A by being press-fitted into an opening 112A (see FIG. 7) of the pre-vent hole 101A. In this case, an external circumferential surface of the pressure introducing tube 25 is adhered to an interior circumference of the pre-vent hole 101A to prevent an internal pressure loss of the cell 100 from being generated.

In another example, as illustrated in FIG. 9, the pressure introducing tube 25 may be coupled to the pre-vent hole 101A by press-fitting or shrink-fitting a protrusion 113A of the pre-vent hole 101A into the hollowed portion 27 of the pressure introducing tube 25. The pre-vent hole 101A includes the protrusion 113A that is externally protruded from the case 140 of the cell 100, and the protrusion 113A has a hollowed portion at the center to communicate with the opening of the pre-vent hole 101A. In this case, an external circumferential surface of the protrusion 113A is adhered to an interior circumference of the pressure introducing tube 25 to prevent an internal pressure loss of the cell 100 from being generated.

Figure 10:
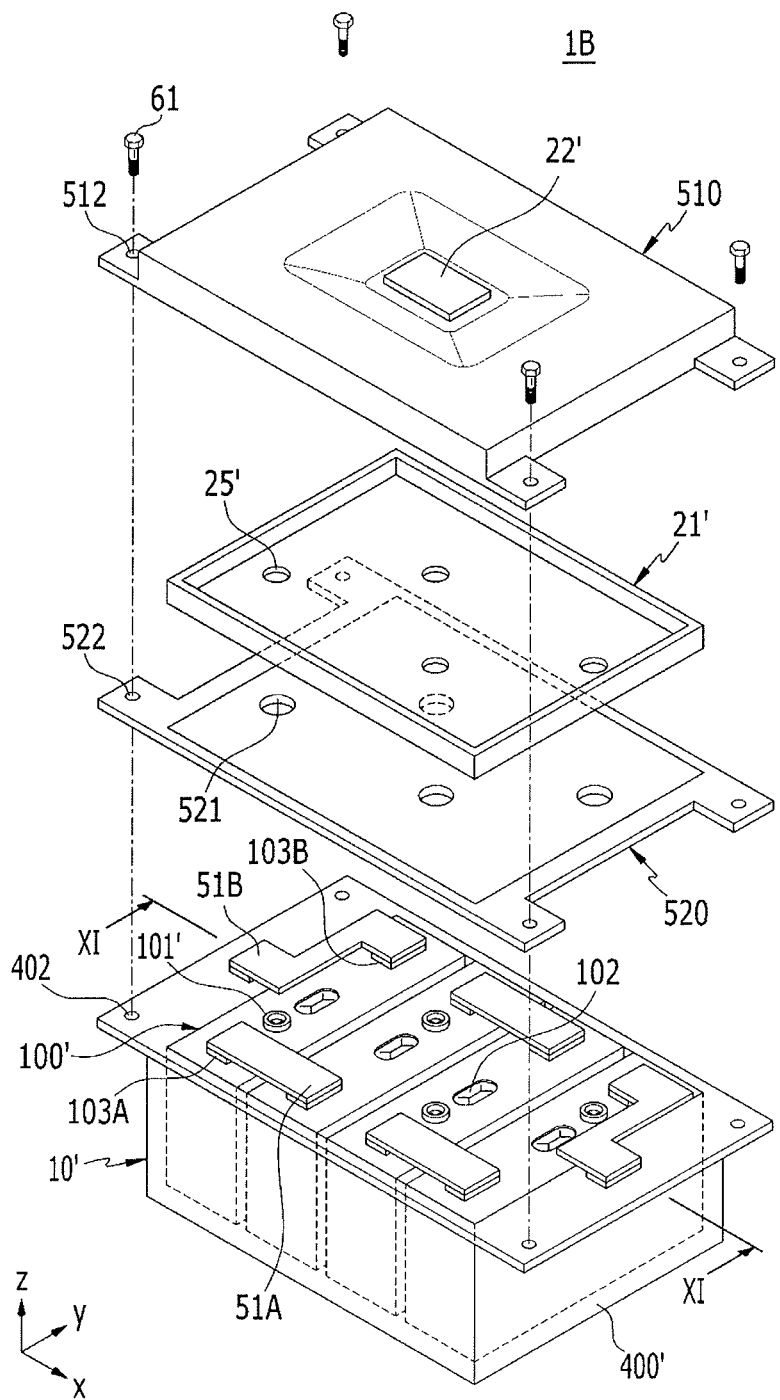
FIG. 10 illustrates an exploded perspective view of a battery pack according to another exemplary embodiment.
Figure 11:
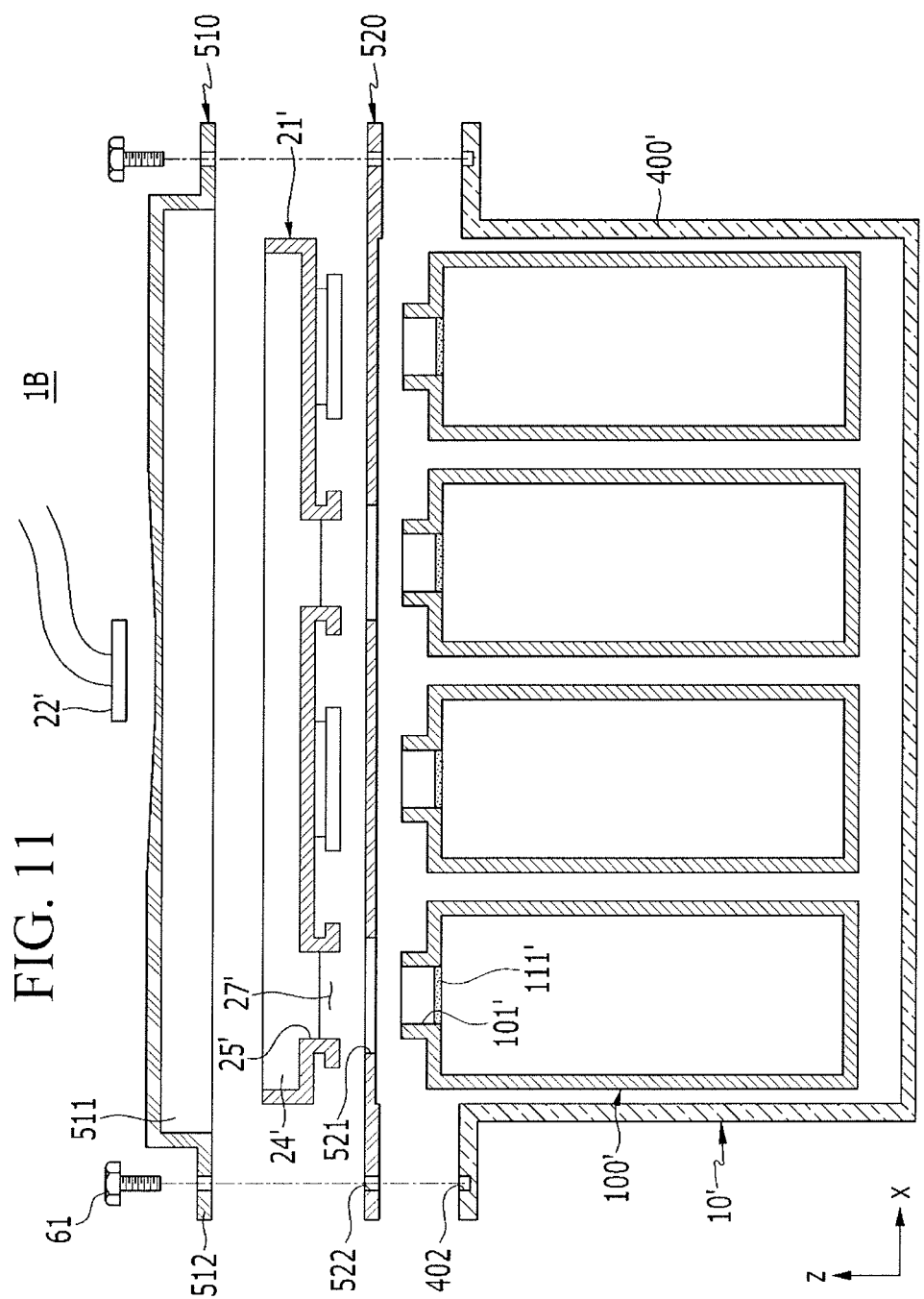
FIG. 11 illustrates a cross-sectional view of the battery pack of FIG. 10 taken along the line XI-XI.
Figure 12:
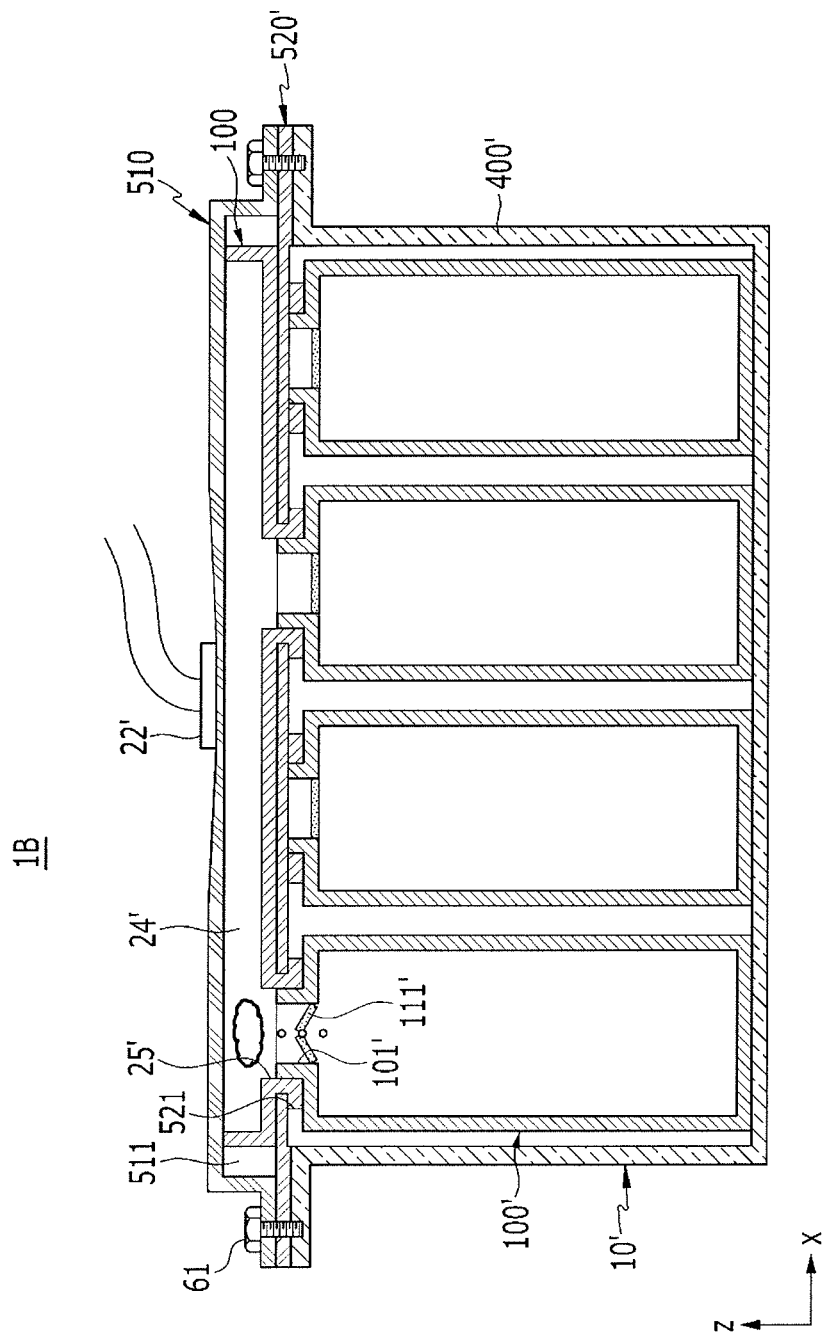
FIG. 12 illustrates a coupling cross-sectional view illustrating the battery pack of FIG. 10.

FIG. 10 is an exploded perspective view schematically illustrating a battery pack according to another exemplary embodiment, and FIG. 11 is a cross-sectional view of the battery pack of FIG. 10 taken along the line XI-XI. FIG. 12 is a coupling cross-sectional view illustrating the battery pack of FIG. 10.

Referring to FIG. 10 to FIG. 12, a battery pack 1B according to the present exemplary embodiment may include a battery module 10', a chamber 21' for measuring an internal pressure of a cell in a unit of battery module, a pressure measuring member 22' coupled to an outside of the chamber 21', a housing 400' configured to accommodate the battery module 10', a cover 510 coupled to the housing 400' to close and seal the battery pack 1B, and a holder 520 configured to fix the cover 510 to the housing 400'. The battery module 10' may include a plurality of cells 100'.

Each of the cells 100' includes a case, and an electrode assembly and an electrolyte solution accommodated in the case. Further, the cell 100 includes a pre-vent hole 101', a main vent hole 102, and a plurality of electrode terminals 103A and 103B. Bus bars 51A and 51B may be coupled to each of the electrode terminals 103A and 103B.

The pre-vent hole 101' is closed and sealed by a vent plate 111'. The vent plate 111' of the pre-vent hole 101' initially closes and seals the pre-vent hole 101', and is cut to open pre-vent hole 101' when an internal pressure of the cell 100' is equal to or greater than a predetermined level. A notch may be formed in the vent plate 111' of the pre-vent hole 101' to induce the cutting of the vent plate 111'. The vent plate 111' of the pre-vent hole 101' may be designed to have a thickness or a notch size so as to be cut at a cell internal pressure that is lower than that of a vent plate of the main vent hole 102. Accordingly, the pre-vent hole 101' may be opened at a cell internal pressure that is lower than that of the main vent hole 102.

The pre-vent hole 101' is connected with the module pressure measuring chamber 21' to exhaust the internal pressure of the cell 100' into the chamber 21' when it is opened. The chamber 21' may be disposed between the housing 400' and the cover 510, and may have a box-like shape with one open side corresponding to the cover 510. As shown in FIG. 12, an opening of the chamber 2 is coupled to the cover 510 to block it from the outside. Accordingly, an internal space 24' of the chamber 21' in which gas exhausted from the cell 100' is gathered may be blocked from the outside.

The chamber 21' includes a plurality of pressure introducing tubes 25' for introducing the gas exhausted from the cells cell 100' into the internal space 24' through the pre-vent holes 101'. The pressure introducing tubes 25' are disposed in one surface of the chamber 21' which faces the housing 400', and are formed to protrude from a lower surface of the chamber 21'. A hollowed portion 27" connected with the internal space 24' of the chamber 21' is formed at the center of the pressure introducing tubes 25'.

The pressure introducing tubes 25' are coupled to the pre-vent holes 101' of the cells 100' to guide the gas exhausted from the pre-vent holes 101' into the internal space 24' of the chamber 21'. The chamber 21' may be formed of a rubber or plastic. When the chamber 21' is formed of a plastic, the pressure introducing tubes 25' may be formed of a rubber.

The cover 510 may be disposed above the chamber 21', and may have a box-like shape with one surface which faces the chamber 21'. The cover 510 include an internal space 511 for accommodating the chamber 21'. In addition, the cover 510 may include a fastening hole 512 for the fastening with the holder 520 and the housing 400'.

The pressure measuring member 22' may be disposed in an upper surface of the cover 510. When the upper surface of the cover 510 is deformed by the internal pressure of the chamber 21', the pressure measuring member 22' can detect the internal pressure of the chamber 21' by detecting the deformation.

The holder 520 may have a plate-like shape, and is disposed between a lower surface of the chamber 21' and the housing 400'. The holder 520 includes a plurality of through-holes 521 into which the pressure introducing tubes 25' are inserted. In addition, the holder 520 may further include a fastening hole 522 for fastening the cover 510 and the housing 400'.

When the battery pack 10B is assembled, the pressure introducing tubes 25' of the chamber 21' are coupled to the through-holes 521 of the holder 520 by a press-fit or shrink-fit method, and then are coupled to the pre-vent holes 101' by the press-fit or shrink-fit method.

Next, the cover 510 is coupled to an upper portion of the chamber 21' to close and seal an opening of the chamber 21', and the cover 510 and the holder 520 is fastened to the housing 400' by a plurality of fastening members 61. Each of the fastening members 61 is coupled to the housing 400' by sequentially penetrating the fastening hole 512 of the cover 510 and the fastening groove 402 of the housing 400'.

In this case, the cover 510 and the holder 520 are adhered and coupled to each other such that the internal space of the chamber 21' is closed and sealed from the outside of the battery pack 1B.

According to the aforementioned exemplary embodiments, the battery pack supports measurement of the pressure in a unit of the battery module by using the pre-vent hole and the chamber. Further, leakage of the battery cell can be detected to estimate a battery cycle-life and estimate a replacement time point for the battery module. In addition, it is possible to recognize in advance whether an organic gas is introduced into the vehicle due to cell leakage. This cell leakage detection makes it possible to recognize a noise of an estimated factor for a charge state or a deterioration state.

By way of summation and review, in a lithium ion battery, an electrolyte solution may be vaporized depending on deterioration of the battery cell, thereby generating a gas. This vaporization of the electrolyte solution in the battery cell may be rapidly increased when the battery is continuously overcharged. A pre-vent hole is used to prevent explosion of the battery due to vaporization of the electrolyte solution. When the rapidly deteriorated battery is continuously charged, the electrolyte solution in the battery cell may be lost due to the action of the pre-vent hole, which in turn, may lead to a fatal defect in a guarantee of use period.

In contrast, exemplary embodiments provide a battery pack capable of effectively detecting mechanical defects of a battery, e.g., cell leakage. That is, according to exemplary embodiments, it is possible to support measurement of the pressure in a unit of the battery module. Further, leakage of the battery cell can be detected to estimate a battery cycle-life and estimate a replacement time point for the battery module. In addition, it is possible to recognize in advance whether an organic gas is introduced into the vehicle due to cell leakage. This cell leakage detection makes it possible to recognize a noise of an estimated factor for a charge state or a deterioration state.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
a plurality of cells;
a pressure measuring chamber adjacent to the plurality of cells; and
a pressure sensor in the chamber to detect an internal pressure of an internal space of the pressure measuring chamber,
wherein each of the cells includes:
a first vent hole that is closed and sealed by a first vent plate, the first vent plate to open to exhaust a cell internal pressure to an exterior of the cell when the cell internal pressure is equal to or greater than a first pressure level, and a second vent hole that is closed and sealed by a second vent plate, the second vent plate to open to exhaust the cell internal pressure into the chamber when the cell internal pressure is equal to or greater than a second pressure level, the first pressure level being higher than that the second pressure level, wherein the first vent plate is exposed to an outside atmosphere, the second vent hole is enclosed by a portion of the pressure measuring chamber, and the first vent plate and the second vent plate are spaced apart from each other, and wherein the internal space of the pressure measuring chamber is coupled to the respective second vent holes of the cells while being blocked from communication with the outside atmosphere such that gas vented through a second vent hole increases the internal pressure of the pressure measuring chamber.

2. The battery pack as claimed in claim 1, wherein the pressure measuring chamber includes a plurality of pressure introducing tubes, the plurality of pressure introducing tubes connecting second vent holes of respective cells of the plurality of cells with the internal space of the pressure measuring chamber.

3. The battery pack as claimed in claim 2, wherein each of the pressure introducing tubes is tightly fitted against an entire perimeter of a respective second vent hole.

4. The battery pack as claimed in claim 1, wherein the pressure sensor is a strain gauge or a piezo gauge.

5. The battery pack as claimed in claim 1, further comprising a controller to detect the internal pressure of the pressure measuring chamber through the pressure sensor, and to detect cell leakage of the cells by comparing a current internal pressure of the pressure measuring chamber with an internal pressure of the pressure measuring chamber measured at a previous time point.

6. The battery pack as claimed in claim 5, wherein the previous time point is a previous charge time point.

7. The battery pack as claimed in claim 5, wherein the controller is to determine that the cell leakage is generated when the current internal pressure of the pressure measuring chamber is lower than the internal pressure of the pressure measuring chamber measured at the previous time point and current internal pressure of the chamber is equal to or lower than a predetermined lower limit.

8. The battery pack as claimed in claim 7, wherein the pressure measuring chamber includes a plurality of pressure introducing tubes, each of which has a hollowed portion connecting the second vent hole of each of the cells with an internal space of the pressure measuring chamber, each of the pressure introducing tubes being coupled to the second vent hole by a press-fit or shrink-fit method.

* * * * *